United States Patent Office 3,173,940
Patented Mar. 16, 1965

3,173,940
POLYOXYLOWERALKYLENE GLYCOL DI
α-SULPHO MONOCARBOXYLATES AND
SALTS THEREOF
George P. Touey and Vinton A. Hoyle, Jr., Kingsport, Tenn., assignors to Eastman Kodak Company, Rochester, N.Y., a corporation of New Jersey
No Drawing. Filed Apr. 16, 1962, Ser. No. 187,911
12 Claims. (Cl. 260—481)

This invention relates to novel anionic surface-active compounds and methods for their preparation. In particular, the invention relates to bis(α-sulfocarboxylic acid) esters of high-molecular-weight, water-insoluble, polypropylene glycols and polybutylene glycols. These diesters are useful as wetting agents, emulsifying agents, detergents, and the like.

An object of the invention is to provide new and improved water-soluble, surface-active compounds based on α-sulfonated monocarboxylic acid diesters of long chain glycols and to provide intermediates for their preparation. Another object is to provide novel polymeric surface-active compounds. A third object is to provide surface-active compounds wherein a polymeric water-insoluble glycol constitutes the hydrophobic member of the molecule, and α-sulfoalkyl monocarboxyl groups chemically attached at each end of the polymeric glycol constitute the hydrophilic members. Another object of the invention is to provide methods for preparing bis(sulfoalkyl acid) esters of polypropylene glycols and polybutylene glycols. Other objects and advantages will appear from the following detailed description.

Novel surface active compounds may be prepared by esterifying both terminal hydroxyl groups of a water-insoluble, high-molecular-weight polypropylene glycol or polybutylene glycol with an α-sulfonated monocarboxylic acid containing 2 to 4 carbon atoms. Salts of these diesters possess surface active properties.

A wide variety of anionic surface-active organic compounds have been disclosed in the literature. Such compounds generally contain long-chain hydrophobic groups terminated at only one end by sulfonate, sulfate, or carboxylate groups. Examples are the sulfated long-chain alcohols, sulfonated benzenes containing long-chain alkyl substituents, and soaps such as sodium stearate and the like. Others are the various sulfated and sulfonated long-chain alkanol amides. All of these compounds owe their surfactant activity to the fact that each possesses one long-chain hydrophobic group which is the main body of the compound and one hydrophilic group, quite short in length, situated at one end of the molecule.

Surface-active compounds based on sulfocarboxylic acid esters of long-chain alcohols are disclosed for instance in U.S. Patents 1,917,252; 2,166,143–145, all to Harris; 2,316,194 to Toone et al.; and British Patent No. 377,249. These compounds contain only one water-solubilizing group near or at the end of a long-chain, water-insoluble group. Among these compounds are sulfoacetates of substituted polyhydroxy compounds, such as glycerol monostearate. Advantages of compounds within the scope of the present invention over such compounds are demonstrated in this specification.

Bis(sulfoalkyl acid) esters of water-insoluble polypropylene and polybutylene glycols within the scope of this invention have water solubilizing groups, one at each end of a long chain glycol group. They may be represented by the following formulas:

(I)
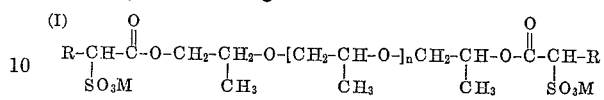

(II)
R—CH—C(=O)—O—CH$_2$—CH$_2$—CH$_2$—O—[CH$_2$—CH$_2$—CH$_2$—O—]$_n$CH$_2$—CH$_2$—CH$_2$—O—C(=O)—CH—R
  |                                                                                              |
  SO$_3$M                                                                                        SO$_3$M (III)
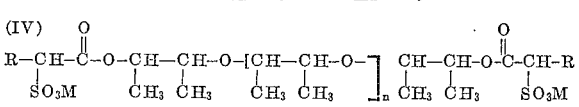

(IV)
R—CH—C(=O)—O—CH—CH—O—[CH—CH—O—]$_n$ CH—CH—O—C(=O)—CH—R
  |           |  |       |  |           |  |             |
  SO$_3$M     CH$_3$ CH$_3$  CH$_3$ CH$_3$    CH$_3$ CH$_3$     SO$_3$M

In all the above formulas R represents H, or an alkyl group of 1 to 2 carbon atoms; M represents a monovalent cation of the types that can be used in anionic surface active agents, for example Na$^+$, K$^+$, NH$_4^+$,

HOCH$_2$CH$_2$NH$_3^+$ (HOCH$_2$CH$_2$)$_2$NH$_2^+$, (HOCH$_2$CH$_2$)$_3$NH$^+$, and the like. Formulas 1 and 2 represent salts of bis(α-sulfoalkyl acid) esters of polypropylene glycols, which can be obtained from either 1,2-propylene oxide or 1,3-propylene oxide. Formulas 3 and 4 represent the salts of bis(sulfoalkyl acid) esters of the polybutylene glycols obtained from 1,2-butylene glycol and 2,3-butylene glycol.

The number of repeating units (designated by $n$ in the formulas) in the polypropylene glycols can range from 18 to 80. Below an $n$ value of 18 propylene glycol is too water-soluble and its α-sulfoacid esters do not give the necessary hydrophilic-hydrophobic ratio for a satisfactory surfactant. Above an $n$ value of 80, the polypropylene glycol esters of the C$_2$ to C$_4$ α-sulfomonocarboxylic acids are not sufficiently water-soluble. In Formulas III and IV the number ($n$) of repeating units can range from 3 to 20. The reason for this limitation is the same as that for the polypropylene glycols. Expressing equivalents of these $n$ values in terms of molecular weights of the polyglycols, the suitable polypropylene glycols have average molecular weights within the range of 1000 to 5000 and suitable polybutylene glycols have average molecular weights within the range of 300 to 1500. The most preferred molecular weight range for polypropylene glycols is between 1200 and 3000 and that for the polybutylene glycols is between 400 and 1000.

The above formulas are given only to illustrate the type of polyglycols which are preferred. Any polypropylene glycol or polybutylene glycol which is water-insoluble, has a molecular weight within the wider of the ranges defined above and which has a terminal and esterifiable hydroxyl group at each end of its structure would be suitable for the synthesis. Also, mixed glycols may be used. For example, in the commercial preparation of polybutylene glycol it is not unusual to polymerize a mixture of the two butylene oxide isomers to obtain a diol having the following structure:

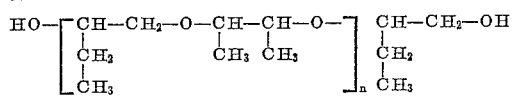

In preferred compounds according to the invention the same molecular weight would apply to these mixed glycols.

The α-sulfomonocarboxylic acid used in preparing the esters of this invention can be prepared by any of several methods known in the art for producing such acids, such as by heating the acid anhydride with sulfuric acid, by treating the organic acid with sulfur trioxide, or by reacting the corresponding α-chloroacid with sodium sulfite. The number of carbon atoms in the α-sulfomonocarboxylic acid can vary from 2 to 4 and the selection of the most suitable sulfo-acid will depend on the type and molecular weight of the polyalkylene glycol to be esterified. With higher molecular weight polyalkylene glycols, sulfoacetic acid is preferred and with lower molecular weight polyalkylene glycols, α-sulfopropionic acid or α-sulfobutyric acid would be preferred. The α-sulfoacids containing more than 4 carbon atoms are generally unsuitable because they form esters of the polyalkylene glycols which are not sufficiently water-soluble. Generally, to be satisfactory as a wetting, emulsifying or cleaning agent, the normal salt of the ester must be at least 0.5 percent soluble in water, that is soluble to at least 0.5 percent concentration in water. Other substitutent groups, such as Cl, $NO_2$, and the like, may be present on the monocarboxylic acid radical in addition to the α-sulfonate substituent, provided that such additional radicals do not render the ester water-insoluble or in some other way impair the ability of the compound to function as a surface-active agent in systems containing water.

Since the surfactants of this invention contain water-solubilizing groups at or near both ends of their molecular structure rather than at one end only, they appear to function differently from the conventional surfactants. The mechanism of the action of a conventional emulsifying agent has been explained by the fact that the long-chain hydrophobic end of the compound is dissolved in an oil phase while the short polar water-soluble group at one end of the molecule is dissolved in the water phase. Thus the molecules are oriented with one end in the water phase and with the other end in the oil phase. Apparently in case of the surfactants described herein, both polar ends of the molecule are dissolved in the water phase while the long-chain center section remains in the oil phase, probably bent into the form of a wedge or an arc.

Bis(sulfoalkyl acid) esters of polyglycols can be prepared by reacting either the free α-sulfonated acid

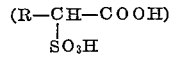

or one of its metal salts

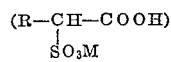

with a molar equivalent or slight excess of the polyglycol under conventional esterification conditions. If the free sulfoacid is used in the esterification, no acid catalyst is necessary. To prevent excessive discoloration, the temperature of the reaction should be maintained below 180° C., preferably between 75–140° C. If the free acid is used, a water azeotroping agent preferably should be present to facilitate the removal of the water of esterification as it is formed, as well as to function as a diluent for the reactants. Azeotroping agents such as benzene, toluene, xylene, and 1,2-dichlorobenzene may be used. After the esterification reaction has been completed, the free sulfonic acid groups in the diester are neutralized to produce the surface active normal salt by adding the stoichiometric amount of a monovalent base, such as an alkali hydroxide or an alkanol amine, to the cooled reaction mixture. Another neutralizing method is to add a basic salt such as sodium acetate to the reaction mixture. Finally, after neutralization, the azeotroping solvent is removed by distillation under reduced pressure to give the crude product. For ordinary purposes any small amount of unreacted glycol remaining in the product will not impair its surface-active properties because at the low concentrations in which the surface-active agent would ordinarily be used, any trace of unreacted glycol in the product would be dispersed into the water to an insignificantly low concentration. However, if desired, unreacted polyglycol may be removed by washing the product in a suitable solvent which is a non-solvent for the diester.

If a monobasic salt of sulfoacid is used in the esterification, presence of an esterification catalyst is preferred in order to shorten the reaction time, and the temperature of the reaction is preferably maintained above 180° C. Suitable catalysts include alkyl and aryl mono- and disulfonic acids, Lewis acids, titanium alkoxides, and certain acid salts such as aluminum sulfate, zinc sulfate, and the like. Preferred catalysts are the titanium alkoxides and with these the preferred reaction temperature range is 190–230° C. Also, it is not necessary to use a water-azeotroping solvent since the water of esterification can conveniently be removed by bubbling an inert gas through the system during the reaction. It is not necessary to neutralize the product or the catalyst when a salt catalyst or titanium alkoxide is used. However, if a strong acid catalyst is used, it should be neutralized with a strong base before the ester is further processed.

Following are examples illustrating some preferred embodiments of the invention:

EXAMPLE 1

The bis(α-sulfobutyric acid) ester (disodium salt) of polypropylene glycol with a molecular weight of 1500.

A 300 g. (0.2 mole) sample of a polypropylene glycol with a molecular weight of 1500 was added to a mixture of 67.2 g. (0.4 mole) of α-sulfobutyric acid and 200 ml. of benzene. This mixture was heated to reflux and azeotropic distillation was continued until no more water could be removed by means of a Dean-Stark trap. The reaction required about 12 hours. When the reaction mixture had returned to room temperature, 33 g. (0.4 mole) of sodium acetate dissolved in 100 ml. of water were added and the mixture was rapidly agitated. When the sulfonic acid groups on the ester and on any unreacted sulfo-acid had been neutralized the water and benzene were distilled off under reduced pressure. The remaining thick paste was dried in an oven at 110° C. overnight.

EXAMPLE 2

The bis(α-sulfoacetic acid) ester (disodium salt) of polybutylene glycol with a molecular weight of 1000.

A 200 g. (0.2 mole) sample of polybutylene glycol with a molecular weight of 1000 was added to a mixture of 56 g. (0.4 mole) of α-sulfoacetic acid and 180 ml. of benzene. This mixture was heated to reflux and the azeotropic distillation continued until no more water was removed by a Dean-Stark trap. This required about 14 hours. When the reaction mixture had returned to room temperature, 17 g. of NaOH dissolved in 100 ml. of water was added and the mixture was rapidly agitated. After neutralization of the sulfonic acid groups on the ester and on any unreacted sulfo acid in this manner, the water and benzene were distilled from the ester under reduced pressure. The resulting product was dried for 12 hours at 110° C.

EXAMPLE 3

The bis(α-sulfopropionic acid) ester (disodium salt) of polybutylene glycol with a molecular weight of 500.

A 100 g. (0.2 mole) sample of polybutylene glycol with a molecular weight of 500 was added to a mixture of 61.6 g. (0.4 mole) of α-sulfopropionic acid and 80 ml. of benzene. This mixture was heated to reflux temperature and water was removed by azeotropic distillation as before. The reaction required about 10 hours. The reaction mixture was neutralized with 17 g. of NaOH as before and the neutral mixture was distilled under reduced pressure to remove the benzene and water. The product was dried at 110° C. for 12 hours.

EXAMPLE 4

The bis(α-sulfoacetic acid) ester (disodium salt) of polypropylene glycol with a molecular weight of 2025.

A 202 g. portion (0.1 mole) of polypropylene glycol with a molecular weight of 2025 was added to a mixture of 31.6 g. (0.2 mole) of sulfoacetic acid monohydrate and 200 ml. of benzene. The mixture was heated and refluxed until the calculated amount of water was removed. After cooling, 16.4 g. (0.2 mole) of sodium acetate dissolved in 25 ml. of water was added and the mixture was stirred for 30 minutes. Finally, 200 ml. of benzene was added and the mixture was distilled until the calculated amount of acetic acid had been removed along with most of the benzene. The remaining thick liquid was poured into a dish and the residual benzene was allowed to evaporate, leaving essentially the pure ester.

EXAMPLE 5

The bis(α-sulfobutyric acid) ester (disodium salt) of polypropylene glycol with a molecular weight of 1200.

A 120 g. portion (0.1 mole) of propylene glycol with a molecular weight of 1200 and 38 g. (0.2 mole) of the monosodium salt of α-sulfobutyric acid were placed in a 3-neck flask equipped with a water condenser, a Dean-Stark trap, a nitrogen gas storage tube, and a magnetic stirrer. A catalytic amount (2 g.) of titanium tetrabutoxide was then added and the mixture was rapidly stirred and heated to 180° C. while a slow stream of nitrogen was bubbled through the mixture. After 6 hours at 180° C. all of the monosodium salt of the α-sulfobutyric acid had dissolved and 35 ml. (approximately 0.2 mole) of water had been removed from the reaction by the stream of nitrogen. The product was allowed to return to room temperature then was washed twice in diethyl ether.

EXAMPLE 6

Surface tension and interfacial tension values were measured for the disodium salts of the bis(α-sulfoacid) esters prepared in Examples 1 through 5. The values found are listed in Table I. Also, shown for comparison in Table I are the same values measured for sodium salts of the sulfoacetic acid esters of lauryl alcohol and glycerol monostearate.

*Table I*

| Alpha-sulfomonocarboxylic Acid Ester | Surface Tension (27° C.), Dynes/Cm. | | Interfacial Tension (27° C.), Dynes/Cm. | |
|---|---|---|---|---|
| | 1% Concn. | 0.25% Concn. | 1% Concn. | 0.25% Concn. |
| Sulfoacetic acid ester of lauryl alcohol | 35.1 | 29.1 | 5.7 | 7.5 |
| Sulfoacetic acid ester of glycerol monostearate | 36.0 | 30.2 | 3.7 | 6.9 |
| Bis(alpha-sulfobutyric acid) ester (disodium salt) of polypropylene glycol—Example 1 | 30.0 | 28.7 | 3.0 | 5.5 |
| Bis(alpha-sulfoacetic acid) ester (disodium salt) of polybutylene glycol—Example 2 | 31.0 | 30.0 | 4.0 | 5.1 |
| Bis(alpha-sulfopropionic acid) ester (disodium salt) of polybutylene glycol—Example 3 | 33.0 | 30.0 | 4.5 | 5.0 |
| Bis(alpha-sulfoacetic acid) ester (disodium salt) of polypropylene glycol—Example 4 | 30.1 | 29.0 | 3.3 | 5.0 |
| Bis(alphasulfobutyric acid) ester (disodium salt) of polypropylene glycol—Example 5 | 30.7 | 30.1 | 3.6 | 4.6 |

Surface tension of distilled water (27° C.)=71.8 dynes/cm.
Interfacial tension of distilled water (27° C.)=44.3 dynes/cm.

EXAMPLE 7

Several sample mixtures containing 80 g. water and 20 g. white mineral oil were prepared. Five grams of each of the emulsifying agents prepared in Examples 1–4 were added to respective ones of these samples and 5 g. of the sulfoacetic acid ester (sodium salt) of glycerol monostearate was added to one sample. One sample containing only water and mineral oil was saved as a control. All the samples were thoroughly mixed to permit emulsification and were then stored for 5 hours at 25° C. The control sample containing no emulsifying agent had completely separated within 2 minutes after it was mixed. At the end of 3 hours the sample containing the glycerol monostearate ester showed visible signs of the emulsion separating and after 5 hours most of the emulsion had broken and separated into two layers. All of the other samples, containing the emulsifying agents of Examples 1–4, showed no visible sign that the emulsions were breaking at the end of 5 hours.

The invention has been described with reference to certain preferred embodiments, but it will be understood that variations and modifications can be made within the scope of the invention as defined in the following claims.

We claim:

1. A compound consisting of the diester of (A) an α-sulfo alkyl monocarboxylic acid containing 2 to 4 carbon atoms and (B) a polyglycol selected from the group consisting of polypropylene glycols having average molecular weights from 1000 to 5000 and polybutylene glycols having average molecular weights from 300 to 1500.

2. A surface active compound consisting of a normal salt of the compound defined in claim 1, said salt being selected from the group consisting of the sodium, potassium, ammonium mono-(β-hydroxyethyl)amino, di-(β-hydroxyethyl)amino and tri-(β-hydroxyethyl)amino salt forms.

3. A compound consisting of a normal sodium salt of the diester of (A) an α-sulfoalkyl monocarboxylic acid containing 2 to 4 carbon atoms, and (B) a polybutylene glycol having terminal hydroxyl groups and having an average molecular weight within the range of 300 to 1500, said glycol being a polymer of 1,2-butylene oxide.

4. A compound according to claim 3 wherein the polybutylene glycol has an average molecular weight between 400 and 1000.

5. A compound consisting of a normal sodium salt of the diester of an α-sulfoalkyl monocarboxylic acid containing 2 to 4 carbon atoms and an average polypropylene glycol having terminal hydroxyl groups and having a molecular weight within the range of 1000 to 5000.

6. A compound according to claim 5 wherein the polypropylene glycol has an average molecular weight between 1200 and 3000.

7. A compound consisting of a normal sodium salt of the diester of (A) an α-sulfoalkyl monocarboxylic acid containing 2 to 4 carbon atoms, and (B) a polybutylene glycol having terminal hydroxyl groups and having an average molecular weight within the range of 300 to 1500, said glycol being a polymer of 2,3-butylene oxide.

8. A compound according to claim 7 wherein the polybutylene glycol has an average molecular weight between 400 and 1000.

9. Disodium salt of the bis(α-sulfobutyric acid) ester of a polypropylene glycol having an average molecular weight between 1200 and 3000.

10. Disodium salt of the bis(α-sulfoacetic acid) ester of a polybutylene glycol having an average molecular weight between 400 and 1000.

11. Disodium salt of the bis(α-sulfopropionic acid) ester of a polybutylene glycol having an average molecular weight between 400 and 1000.

12. Disodium salt of the bis(α-sulfoacetic acid) ester of a polypropylene glycol having an average molecular weight between 1200 and 3000.

References Cited by the Examiner
UNITED STATES PATENTS 3,041,371    6/62    Goldsmith et al. _____ 260—486

FOREIGN PATENTS 377,249    7/32    Great Britain.

LEON ZITVER, Primary Examiner.

A. LOUIS MONACELL, Examiner.

UNITED STATES PATENT OFFICE
CERTIFICATE OF CORRECTION

Patent No. 3,173,940

March 16, 1965

George P. Touey et al.

It is hereby certified that error appears in the above numbered patent requiring correction and that the said Letters Patent should read as corrected below.

Column 6, line 40, after "ammonium" insert a comma; line 56, for "an average" read -- a --; line 58, for "a" read -- an average --.

Signed and sealed this 3rd day of August 1965.

(SEAL)
Attest:

ERNEST W. SWIDER
Attesting Officer

EDWARD J. BRENNER
Commissioner of Patents